Patented Jan. 16, 1940

2,187,328

UNITED STATES PATENT OFFICE 2,187,328

PARA-SECONDARY ALKYLAMINOBENZAL-DEHYDES AND PROCESS OF MAKING THEM

Wolfgang Richter, Halle-on-the-Saale, Germany, assignor to General Aniline Works, Inc., New York, N. Y., a corporation of Delaware No Drawing. Application February 18, 1939, Serial No. 257,143. In Germany February 21, 1938

8 Claims. (Cl. 260—577)

The present invention relates to a process for manufacturing para-aminobenzaldehydes and to the new products obtainable according to this process.

According to the process described by A. Vilsmeier and A. Haack (compare "Berichte der Deutschen Chemischen Gesellschaft", 1927, vol. 60, page 119) the aldehyde group may be introduced in para-position into tertiary aromatic amines, such as N-dimethylaniline, by causing the amine to react with formyl-N-methylaniline and phosphorus oxychloride. Many attempts have been made to apply this process to secondary aromatic amines, such as N-ethylaniline, N-n-butylaniline or N-methyl-ortho-toluidine, but they have not been successful.

The present invention is based on the unexpected observation that secondary N-alkylanilines containing an alkyl group with at least two side chains are capable of forming aldehydes by reaction with phosphorus oxychloride and formyl-N-methylaniline of the formula

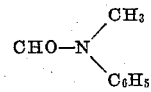

Secondary alkylanilines of this kind are, for instance, α-tertiary-butyl - N - ethylaniline (2 - dimethyl - 3 - anilidobutane) or N - (diisopropyl-methyl)-aniline. The derivatives of these anilines having alkyl groups as substituents in the benzene nucleus are suitable for this reaction if the para-position is free.

The following examples illustrate the invention, the parts being by weight:—

*Example 1.*—96.3 parts of phosphorus oxychloride are caused to run into a solution of 85 parts of formyl-N-methyl-aniline in 10 parts of dry benzene and the whole is stirred for one hour at room temperature. The mixture is cooled to 0° C. and 95 parts of di-isopropyl-methylaniline dissolved in 50 parts of dry benzene, are introduced, drop by drop, while well stirring. The whole is stirred for 4 hours at a temperature below +10° C. and then for 15 hours at room temperature. After the mixture has been shaken with 4000 parts of water the aldehyde dissolved in the benzene separates in the form of a yellowish-brown oil. The aldehyde is taken up with benzene and dried with a mixture of calcined sodium carbonate and anhydrous sodium sulfate. After the benzene has been expelled, 106 parts of crude aldehyde are obtained, which boils at 176° C. to 178° C. under a pressure of 1 mm. It forms a yellowish oil which becomes crystalline on standing for a prolonged time. Its composition corresponds with the formula:

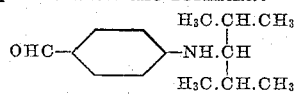

*Example 2.*—34 parts of formyl methyl-aniline, 10 parts of benzene and 38.5 parts of phosphorus oxychloride are stirred together in the same manner as described in Example 1. A solution of 42 parts of 2-dimethyl-3-ortho-toluidine-butane in 25 parts of benzene is added, drop by drop, to the mixture cooled to 0°. During this addition the temperature must not exceed 10° C. After 4 hours the temperature is raised to room temperature and stirring is continued for 10 hours. The solution is then extracted with 2000 parts of water and the aldehyde is taken up with benzene. After the aldehyde has been dried with a mixture of calcined sodium carbonate and anhydrous sodium sulfate, the benzene is expelled. The solution is then distilled under reduced pressure of 1 mm. of mercury. There are obtained 41 parts of aldehyde. The pure aldehyde boils at 145° to 150° C. under a pressure of 1 mm. of mercury. It is a yellowish, viscous oil which as regards its composition corresponds with the formula:

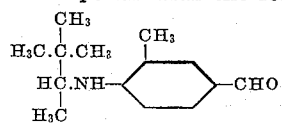

*Example 3.*—38 parts of 2-dimethyl-3-anilidobutane dissolved in 20 parts of benzene are introduced, drop by drop, at a temperature of 0° C. into a mixture of 34 parts of formyl-methyl-aniline, 10 parts of benzene and 38.5 parts of phosphorus oxychloride which has been stirred in known manner. After 4 hours' stirring at 10° C. the temperature is raised to 18° C. and the mixture is allowed to stand for 10 hours. The mixture is then stirred with 1500 parts of water and the yellowish oil is taken up with benzene. After drying with a mixture of calcined sodium carbonate and anhydrous sodium sulfate the benzene is evaporated and the aldehyde is distilled at 180° C. to 190° C. under a pressure of 11 mm. of mercury. There are obtained 17 parts of a yellowish oil corresponding to the formula:

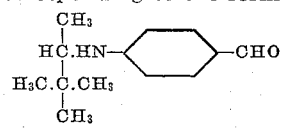

It is obvious that my invention is not limited to the foregoing examples or to the specific details given therein. Other secondary alkylanilines, bearing at least two side chains, may be treated in a completely analogous manner; furthermore, such secondary alkylanilines of the kind in question, but containing nuclear substituents, such as halogen, nitro, alkyl, alkoxy and having a free para-position with respect to the amino group, may likewise be subjected to the said reaction.

The end products thus obtainable are valuable intermediate products for the manufacture of dyes thus as, for instance, triphenylmethane dyes or for the production of pharmaceutical substances.

What I claim is:

1. The process which comprises reacting a secondary alkylaniline, the alkyl group of which has at least two side chains, with phosphorus oxychloride and formyl-N-methylaniline.

2. The process which comprises reacting diisopropylmethylaniline with phosphorus oxychloride and formyl-N-methylaniline.

3. The process which comprises reacting 2-dimethyl-3-ortho-toluidine-butane with phosphorus oxychloride and formyl-N-methylaniline.

4. The process which comprises reacting 2-dimethyl-3-anilido-butane with phosphorus oxychloride and formyl-N-methylaniline.

5. The compounds corresponding to the general formula

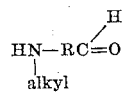

wherein R means a radicle of the benzene series and wherein the alkyl group contains at least two side chains.

6. The compound which corresponds to the formula

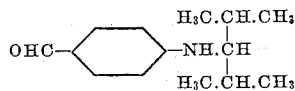

7. The compound which corresponds to the formula

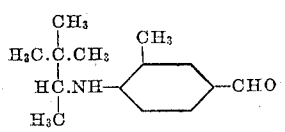

8. The compound which corresponds to the formula

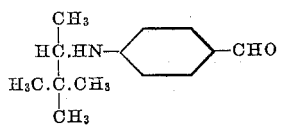

WOLFGANG RICHTER.